(12) United States Patent
Wakabayashi (10) Patent No.: US 9,319,610 B2
(45) Date of Patent: Apr. 19, 2016

(54) IMAGE PICKUP DEVICE, CONTROL METHOD, AND IMAGE PICKUP APPARATUS

(75) Inventor: Hayato Wakabayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/239,325

(22) PCT Filed: Aug. 30, 2012

(86) PCT No.: PCT/JP2012/071967
§ 371 (c)(1),
(2), (4) Date: Feb. 18, 2014

(87) PCT Pub. No.: WO2013/035616
PCT Pub. Date: Mar. 14, 2013

(65) Prior Publication Data
US 2014/0160334 A1    Jun. 12, 2014

(30) Foreign Application Priority Data
Sep. 6, 2011 (JP) .................................. 2011-193824

(51) Int. Cl.
*H04N 5/3745* (2011.01)
*H04N 5/343* (2011.01)
(Continued)

(52) U.S. Cl.
CPC ........... *H04N 5/37455* (2013.01); *H04N 5/343* (2013.01); *H04N 5/35545* (2013.01); *H04N 5/378* (2013.01)

(58) Field of Classification Search
USPC .......................................... 348/207.99–376
See application file for complete search history.

(56) References Cited

U.S. PATENT DOCUMENTS

| 4,270,081 A * | 5/1981 | Hareyama ..................... 323/316 |
| 2005/0040509 A1* | 2/2005 | Kikuchi et al. ............... 257/686 |
| 2005/0195304 A1* | 9/2005 | Nitta ................... H03M 1/1023 348/308 |

(Continued)

FOREIGN PATENT DOCUMENTS

| JP | 2005-347932 | 12/2005 |
| JP | 2008-535397 | 8/2008 |

(Continued)

OTHER PUBLICATIONS

Title: Translation of JP2011-142556 Author: Koyama, Yusaku Date: Jul. 2011.*

(Continued)

*Primary Examiner* — Twyler Haskins
*Assistant Examiner* — Wesley J Chiu
(74) *Attorney, Agent, or Firm* — Michael Best & Friedrich LLP (57) ABSTRACT

The present disclosure relates to an image pickup device, a control method, and an image pickup apparatus, which can implement more various data outputs.
An image pickup apparatus of the present disclosure includes a pixel array in which incident light of an object is photoelectrically converted by a photoelectric conversion element at each of a plurality of pixels arranged in a matrix form, a selection unit that selects the number of A/D converters that output a pixel signal of each pixel in the pixel array, and a control unit that controls the selection unit and causes the selection unit to select the number of the A/D converters according to a request. The present disclosure can be applied to an image pickup device, a control method, and an image pickup apparatus.

17 Claims, 8 Drawing Sheets

(51) Int. Cl.
    *H04N 5/355* (2011.01)
    *H04N 5/378* (2011.01)

(56) References Cited

U.S. PATENT DOCUMENTS

| | | | |
|---|---|---|---|
| 2006/0220939 A1 | 10/2006 | Kirsch | |
| 2007/0146514 A1* | 6/2007 | Maeda | H04N 5/3456 348/294 |
| 2008/0019208 A1 | 1/2008 | Kirsch | |
| 2008/0084486 A1* | 4/2008 | Enge et al. | 348/239 |
| 2008/0129851 A1 | 6/2008 | Kasuga et al. | |
| 2008/0258042 A1* | 10/2008 | Krymski | H04N 3/155 250/208.1 |
| 2008/0284888 A1* | 11/2008 | Kobayashi | 348/308 |
| 2009/0040350 A1 | 2/2009 | Yamauchi | |
| 2009/0051801 A1 | 2/2009 | Mishina et al. | |
| 2009/0122160 A1 | 5/2009 | Kirsch | |
| 2009/0128678 A1* | 5/2009 | Kitami | H04N 5/23245 348/308 |
| 2009/0219428 A1* | 9/2009 | Nakano | H04N 5/347 348/308 |
| 2009/0295959 A1 | 12/2009 | Shoho et al. | |
| 2009/0322917 A1* | 12/2009 | Kyogoku | H01L 27/14621 348/273 |
| 2010/0020211 A1* | 1/2010 | Inada | H03M 1/1023 348/294 |
| 2010/0182465 A1 | 7/2010 | Okita | |
| 2010/0259662 A1 | 10/2010 | Oike et al. | |
| 2010/0271523 A1* | 10/2010 | Hara | H04N 5/367 348/302 |
| 2010/0276572 A1* | 11/2010 | Iwabuchi et al. | 250/208.1 |
| 2011/0025900 A1* | 2/2011 | Kondo | H04N 5/378 348/308 |
| 2011/0037868 A1* | 2/2011 | Ota | H04N 5/357 348/222.1 |
| 2011/0134267 A1 | 6/2011 | Ohya | |
| 2012/0049042 A1* | 3/2012 | Lim | H04N 5/3575 250/208.1 |
| 2012/0119065 A1* | 5/2012 | Cieslinski | H04N 5/3658 250/208.1 |

FOREIGN PATENT DOCUMENTS

| | | |
|---|---|---|
| JP | 2009-044680 | 2/2009 |
| JP | 2009-049740 | 3/2009 |
| JP | 2009-290613 | 12/2009 |
| JP | 2010-193437 | 9/2010 |
| JP | 2011-120087 | 6/2011 |
| JP | 2011-142556 | 7/2011 |
| JP | 2011142556 A * | 7/2011 |
| WO | WO-2010/073520 A1 | 7/2010 |

OTHER PUBLICATIONS

International Search Report; Application No. PCT/2012/071967; Filed: Aug. 30, 2012. Completion of International Search Report: Sep. 20, 2012. (Form PCT/ISA/210).

Written Opinion of the International Searching Authority; Application No. PCT/2012/071969; Filed: Aug. 30, 2012. Report Dated: Oct. 2, 2012. (Form PCT/ISA/220 and PCT/ISA/237).

Japanese Office Action issued Jun. 2, 2015 for corresponding Japanese Application No. 2011-193824.

Extended European Search Report issued Mar. 20, 2015 for corresponding European Application No. 12830438.3.

* cited by examiner

|       | SELECTION SW1 | SELECTION SW2 | ADSW1 | ADSW2 | ADSW3 | ADSW4 |
|-------|---------------|---------------|-------|-------|-------|-------|
| MODE1 | ON            | ON            | ON    | ON    | ON    | ON    |
| MODE2 | OFF           | OFF           | ON    | ON    | ON    | ON    |
| MODE3 | ON            | ON            | ON    | ON    | OFF   | OFF   |

IMAGE PICKUP DEVICE, CONTROL METHOD, AND IMAGE PICKUP APPARATUS

TECHNICAL FIELD

The present disclosure relates to an image pickup device, a control method, and an image pickup apparatus, in particular to an image pickup device, a control method, and an image pickup apparatus, which can implement more various data outputs.

BACKGROUND ART

Conventionally, there is an image pickup device such as a CMOS (Complementary Metal Oxide Semiconductor) image sensor in which a plurality of A/D converters (ADCs (Analog Digital Converters)) are connected to each output line to which pixels are connected for each column and high-speed data reading is achieved by using the plurality of ADCs (for example, see Patent Document 1).

Further, there is an image pickup device in which a plurality of comparators and counters are mounted on each output line, a voltage of a D/A converter (DAC (Digital Analog Converter)) is shifted by an arbitrary value, and a signal of high bit accuracy is read at high speed (for example, see Patent Document 2).

Further, there is an image pickup device in which noise is reduced and dynamic range is improved by performing A/D conversion twice on a read-out signal (for example, see Patent Document 3 and Patent Document 4).

CITATION LIST

Patent Documents

Patent Document 1: JP 2005-347932 A
Patent Document 2: JP 2010-252140 A
Patent Document 3: JP 2009-296423 A
Patent Document 4: JP 2008-012482 A

SUMMARY OF THE INVENTION

Problems to be Solved by the Invention

However, in the case of the method described in Patent Document 1, only high-speed reading is possible and it is difficult to, for example, expand dynamic range, reduce noise, and develop high functionality.

Further, in the case of the method described in Patent Document 2, although a plurality of ADCs are provided, a configuration of the ADCs is used only to improve resolution, and it is difficult to, for example, reduce noise and power consumption.

Further, in the case of the method described in Patent Document 3 and Patent Document 4, the processing time increases and it is difficult to perform high speed reading.

In recent years, as the information processing technique improves, functions of image processing and image pickup apparatuses are more and more increased and enhanced. Accordingly, output formats required for image data outputted from an image pickup device are further diversified. However, in the conventional methods, as described above, it is difficult to handle various data output formats.

The present disclosure is made in view of the above situation and an object of the present disclosure is to implement more various data outputs to be able to be used for more various uses.

Solutions to Problems

An aspect of the present disclosure is an image pickup device including a selection unit that selects the number of A/D converters that output a pixel signal of each pixel and a control unit that controls the selection unit and causes the selection unit to select the number of the A/D converters according to a request.

The image pickup device further includes a plurality of the A/D converters for each column of a pixel array, and the selection unit can select an output destination of the pixel signal from among the plurality of A/D converters corresponding to the column.

The control unit can control the selection unit so as to connect each pixel of the column to the plurality of A/D converters.

The control unit can divide the pixels of the column into a plurality of paths and control the selection unit so as to connect pixels of each path to the A/D converter different from the A/D converters connected to pixels of the other paths.

The control unit can perform control so that a pixel signal is read from each pixel at a different rate for each path.

The control unit can control the A/D converters and set setting of each A/D converter to a setting value different from each other for each path.

The control unit can set analog gain setting of the A/D converters to a value different from each other for each path.

The control unit can set resolution setting of the A/D converters to a value different from each other for each path.

The control unit can set sampling timing of the A/D converters to a value different from each other for each path.

The control unit can control the A/D converters so that outputs of the A/D converters of each path, which are sampled at timings different from each other and processed, are additionally averaged and outputted.

The control unit can control the selection unit so as to stop some of the A/D converters and connect pixels of the column to the remaining A/D converters.

The control unit can further stop constant current circuits corresponding to the stopped A/D converters.

The image pickup device can have a laminated structure in which a plurality of chips are laminated.

The image pickup device can include a pixel chip in which a pixel array from which the pixel signals are read is formed and a peripheral circuit chip in which a peripheral circuit, the control unit, the selection unit, and the A/D converters are formed.

The number of wiring layers of the peripheral circuit chip can be greater than the number of wiring layers of the pixel chip.

Another aspect of the present disclosure is a control method in which a receiving unit receives a request and a control unit selects the number of A/D converters that output a pixel signal of each pixel in a mode according to the received request.

Further another aspect of the present disclosure is an image pickup apparatus including a pixel array in which incident light is photoelectrically converted at each pixel, a selection unit that selects the number of A/D converters that output a pixel signal of each pixel in the pixel array, and a control unit that controls the selection unit and causes the selection unit to select the number of the A/D converters according to a request.

In an aspect of the present disclosure, the number of A/D converters that output a pixel signal of each pixel is selected according to a request.

In another aspect of the present disclosure, a request is received and the number of A/D converters that output a pixel signal of each pixel is selected in a mode according to the received request.

In further another aspect of the present disclosure, incident light is photoelectrically converted at each pixel and the number of A/D converters that output a pixel signal of each pixel is selected according to a request.

Effects of the Invention

According to the present disclosure, it is possible to pick up an image of an object. In particular, it is possible to implement more various data outputs.

MODES FOR CARRYING OUT THE INVENTION

The following is a description of modes for carrying out the present technique (hereinafter referred to as the embodiments). Explanation will be made in the following order.
1. First Embodiment (Image Sensor)
2. Second Embodiment (Image Pickup Apparatus)
3. Third Embodiment (Computer)

1. First Embodiment

Figure 1:
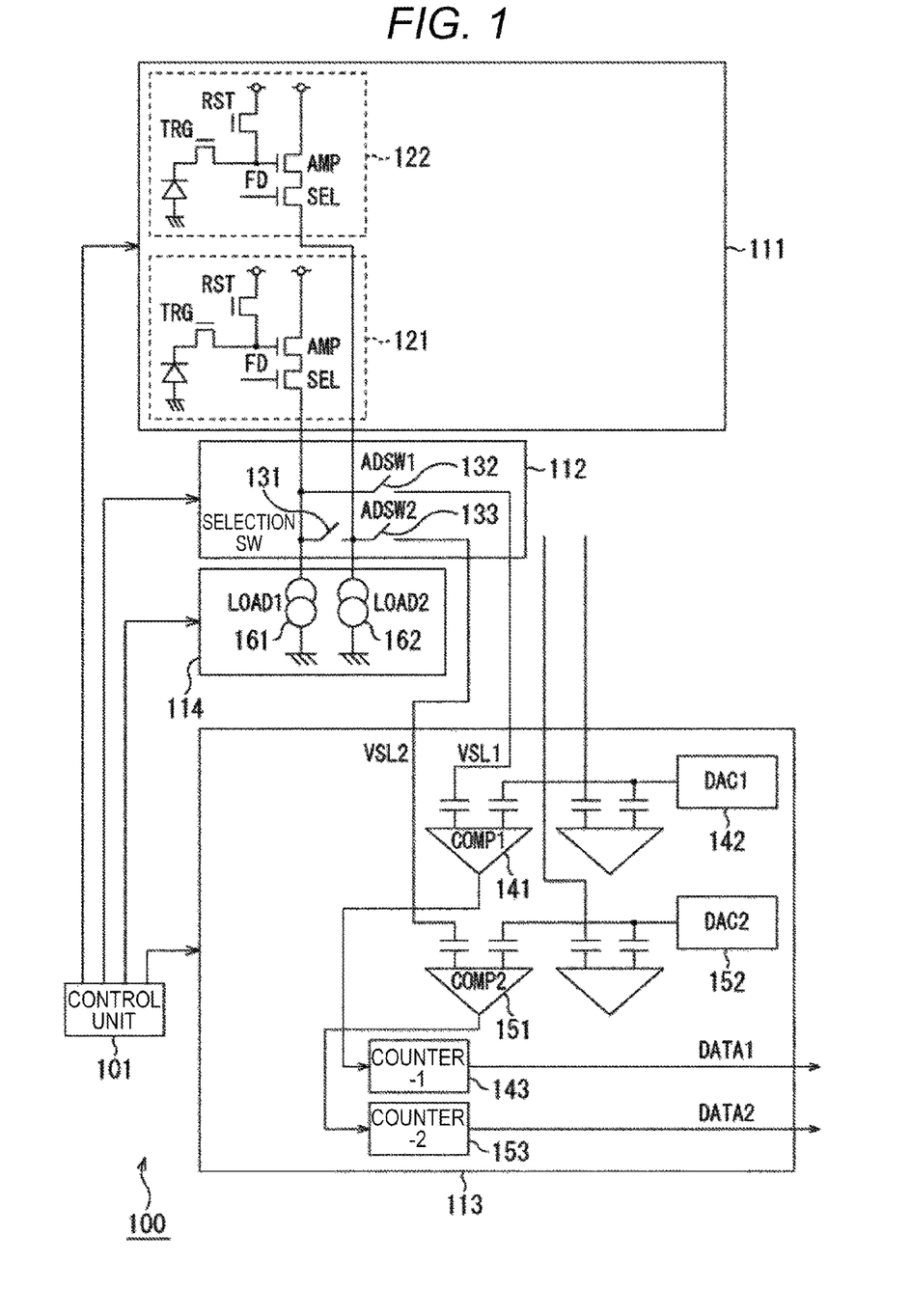
FIG. 1 is a block diagram showing a main configuration example of an image sensor to which the present technique is applied.

[Image Sensor]
FIG. 1 is a block diagram showing a partial configuration example of an image sensor to which the present technique is applied. An image sensor 100 shown in FIG. 1 is an image pickup device such as, for example, a CMOS (Complementary Metal Oxide Semiconductor) image sensor and a CCD (Charge Coupled Device) image sensor, which picks up an image of an object and obtains digital data of a picked-up image.

As shown in FIG. 1, the image sensor 100 includes a control unit 101, a pixel array unit 111, a selection unit 112, an A/D converter (ADC (Analog Digital Converter)) 113, and a constant current circuit unit 114.

The control unit 101 controls each unit of the image sensor 100 and causes the units to perform processing related to reading of image data (pixel signal) and the like.

The pixel array unit 111 is a pixel area in which pixels having a photoelectric conversion element such as a photodiode are arranged in a matrix (array) form. The pixel array unit 111 is controlled by the control unit 101, receives light of an object at each pixel, photoelectric-converts the incident light to accumulate electric charges, and outputs the electric charges accumulated in each pixel as a pixel signal at a predetermined timing.

The pixel 121 and the pixel 122 indicate two pixels vertically adjacent to each other in a pixel group arranged in the pixel array unit 111. The pixel 121 and the pixel 122 are pixels in continuous rows in the same column. In the case of the example in FIG. 1, as shown by the pixel 121 and the pixel 122, a photoelectric conversion element and four transistors are used in a circuit of each pixel. The configuration of each pixel is optional, so that it is possible to use a configuration other than the example shown in FIG. 1.

In a common pixel array, an output line of the pixel signal is provided for each column. In the case of the pixel array unit 111, two (two-path) output lines are provided for each column. The circuits of pixels in one column are alternately connected to the two output lines every other row. For example, a circuit of a pixel in an odd-numbered row from the top is connected to one output line and a circuit of a pixel in an even-numbered row is connected to the other output line. In the case of the example in FIG. 1, the circuit of the pixel 121 is connected to a first output line (VSL1) and the circuit of the pixel 122 is connected to a second output line (VSL2).

In FIG. 1, for convenience of description, only the output lines for one column are shown. However, in practice, two output lines are provided to each column in the same manner. The circuits of the pixels in the column are alternately connected to each output line every other row.

The selection unit 112 has switches that connect each output line of the pixel array unit 111 to inputs of the ADC 113. The selection unit 112 is controlled by the control unit 101 and controls connection between the pixel array unit 111 and the ADC 113. In summary, the pixel signals read from the pixel array unit 111 are supplied to the ADC 113 through the selection unit 112.

The selection unit 112 includes a switch 131, a switch 132, and a switch 133. The switch 131 (selection switch) controls connection of two output lines corresponding to the same column. For example, when the switch 131 becomes ON state, a first output line (VSL1) and a second output line (VSL2) are connected and when the switch 131 becomes OFF state, the first output line (VSL1) and the second output line (VSL2) are disconnected.

Although the details are described later, in the image sensor 100, one ADC is provided to each output line (column ADC). Therefore, if both the switches 132 and 133 are in ON state, when the switch 131 becomes ON state, two output lines of the same column are connected, so that the circuit of one pixel is connected to two ADCs. On the other hand, when the switch 131 becomes OFF state, two output lines of the same column are disconnected, so that the circuit of one pixel is connected to one ADC. In other words, the switch 131 selects the number of ADCs (column ADCs) which are output destinations of a signal of one pixel.

Although the details are described later, the switch 131 controls the number of ADCs which are output destinations of the pixel signal, so that the image sensor 100 can outputs various pixel signals according to the number of ADCs. In other words, the image sensor 100 can implement more various data outputs.

The switch 132 controls connection between the first output line (VSL1) corresponding to the pixel 121 and the ADC corresponding to the output line. When the switch 132 becomes ON state, the first output line is connected to one input of a comparator of the corresponding ADC. When the switch becomes OFF state, these are disconnected.

The switch 133 controls connection between the second output line (VSL2) corresponding to the pixel 122 and the ADC corresponding to the output line. When the switch 133 becomes ON state, the second output line is connected to one input of a comparator of the corresponding ADC. When the switch becomes OFF state, these are disconnected.

The selection unit 112 can control the number of ADCs (column ADCs) which are output destinations of the signal of one pixel by changing the states of the switch 131 and the switch 133 according to the control of the control unit 101.

It is possible to omit the switch 132 and/or the switch 133 (either one or both of them) and connect each output line and the ADC corresponding to the output line at all times. However, when these connections/disconnections can be controlled by these switches, it is possible to have a wide selection range of the number of ADCs (column ADCs) which are output destinations of the signal of one pixel. In other words, the image sensor 100 can output more various pixel signals by providing these switches.

In FIG. 1, only the configuration of output lines for one column is shown. However, in practice, the selection unit 112 has the same configuration as that shown in FIG. 1 (switches 131 to 133) for each column. In other words, the selection unit 112 performs the same connection control as that described above according to the control of the control unit 101 for each column.

The ADC 113 A/D-converts the pixel signals supplied from the pixel array unit 111 through the output lines and outputs the pixel signals as digital data. The ADC 113 has the ADC (column ADC) for each output line from the pixel array unit 111. In other words, the ADC 113 has a plurality of column ADCs. The column ADC corresponding to one output line is a single-slope ADC including a comparator, a D/A converter (DAC), and a counter.

The comparator compares a DAC output and a signal value of the pixel signal. The counter increments a count value (digital value) until the pixel signal and the DAC output become equal. The comparator stops the counter when the DAC output reaches the signal value. Thereafter, the signals digitalized by the counters 1 and 2 are outputted to the outside of the image sensor 100 from DATA1 and DATA2.

The counters return the count value to an initial value (for example, 0) after outputting data for the next A/D conversion.

The ADC 113 has two-path column ADCs for each column. For example, a comparator 141 (COMP1), a DAC 142 (DAC1), and a counter 143 (counter-1) are provided for the first output line (VSL1) and a comparator 151 (COMP2), a DAC 152 (DAC2), and a counter 153 (counter-2) are provided for the second output line (VSL2). Although not shown in the drawings, the ADC 113 has the same configuration for the output line of the other columns.

However, the DAC can be shared in these configurations. The DAC is shared for each path. In other words, the DAC of the same path of each column is shared. In the case of the example in FIG. 1, the DAC corresponding to the first output line (VSL1) of each column is shared as the DAC 142 and the DAC corresponding to the second output line (VSL2) of each column is shared as the DAC 152. The comparator and the counter are provided for each path of output lines.

The constant current circuit unit 114 is a constant current circuit connected to each output line and driven by being controlled by the control unit 101. The circuit of the constant current circuit unit 114 is formed by, for example, a MOS (Metal Oxide Semiconductor) transistor. Although the configuration of the circuit is optional, in FIG. 1, for convenience of description, a MOS transistor 161 (LOAD1) is provided for the first output line (VSL1) and a MOS transistor 162 (LOAD2) is provided for the second output line (VSL2).

The control unit 101 selects a read mode by receiving a request from outside such as, for example, a user, controls the selection unit 112, and controls connection of the output lines. Further, the control unit 101 controls drive of the column ADCs according to the selected read mode. Further, the control unit 101 controls drive of the constant current circuit unit 114 and drive of the pixel array unit 111 such as, for example, a rate and timing of reading, as needed in addition to the drive of the column ADCs.

In other words, the control unit 101 can cause not only the selection unit 112 but also each unit other than the selection unit 112 to operate in more various modes. Therefore, the image sensor 100 can output more various pixel signals.

[Other Examples of Image Sensor]

The number of units of each unit shown in FIG. 1 is optional unless it is insufficient. For example, three or more paths of output lines may be provided for each column. For example, as shown in A of FIG. 2, four paths of output lines may be provided for each column of the pixel array unit 111.

Figure 2:
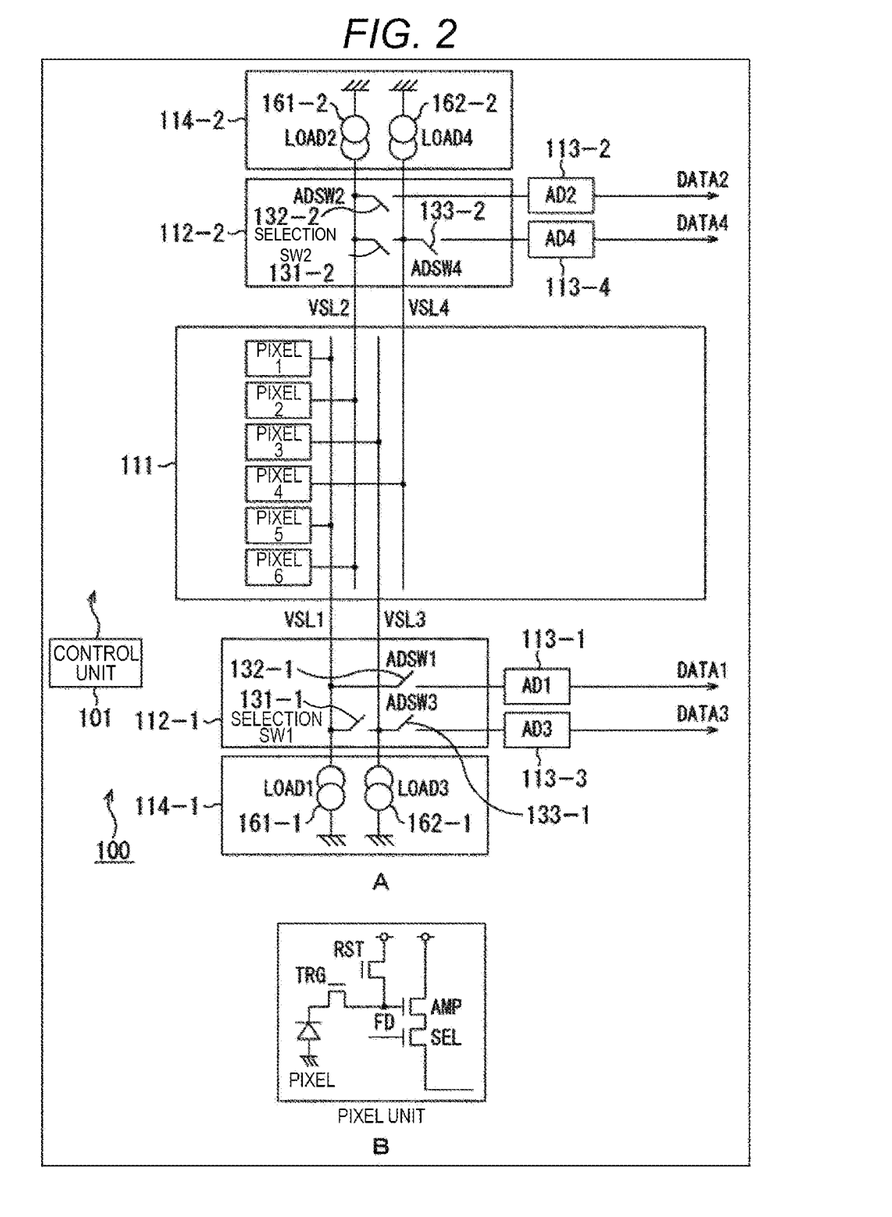
FIG. 2 is a block diagram showing another configuration example of an image sensor to which the present technique is applied.

In A of FIG. 2, the pixels 1 to 6 in the pixel array unit 111 indicate a circuit of continuous six pixels in the same column in the pixel array formed in the pixel array unit 111. Although the circuit configuration of each pixel is optional, for example, as shown in B of FIG. 2, a circuit configuration using four transistors may be used.

As shown in A of FIG. 2, four paths of output lines are provided for one column and pixel circuits are connected to the four paths of output lines respectively for every four rows. In other words, the pixel circuits are connected to the same path of output line for every four rows. In A of FIG. 2, the pixels 1 and 5 are connected to the first output line (VSL1), the pixels 2 and 6 are connected to the second output line (VSL2), the pixel 3 is connected to the third output line (VSL3), and the pixel 4 is connected to the fourth output line (VSL4).

In the same manner as in FIG. 1, the column ADC is provided corresponding to each path of output line. Each of ADCs 113-1 to 113-4 indicates one path of single-slope column ADC and includes a comparator, a DAC, and a counter. Specifically, each of a pair of the ADC 113-1 (AD1) and the ADC 113-3 (AD3) and a pair of the ADC 113-2 (AD2) and the ADC 113-4 (AD4) corresponds to the ADC 113 in FIG. 1.

More specifically, each of the ADC 113-1 and the ADC 113-2 corresponds to the comparator 141, the DAC 142, and the counter 143 in FIG. 1. Further, each of the ADC 113-3 and the ADC 113-4 includes the comparator 151, the DAC 152, and the counter 153 in FIG. 1. However, the DAC may be shared by the ADC 113-1, the ADC 113-2, the ADC 113-3, and the ADC 113-4.

In the case of the example in A of FIG. 2, two paths of selection units 112 (selection unit 112-1 and selection unit 112-2) are provided for each column.

The selection unit 112-1 selects the number of ADCs (column ADCs) which are output destinations of the signal of one pixel by controlling whether or not to connect the first output line (VSL1) and the third output line (VSL3) among the four output lines of each column to the ADC 113-1 or the ADC 113-3. In the same manner as in FIG. 1, the selection unit 112-1 includes a switch 131-1 (selection SW1), a switch 132-1 (ADSW1), and a switch 133-1 (ADSW3).

The switch 131-1 controls connection between the first output line and the third output line. When the switch 131-1 becomes ON state, the first output line and the third output line are connected and when the switch 131-1 becomes OFF state, the first output line and the third output line are disconnected. The switch 132-1 controls connection between the first output line and the ADC 113-1. The switch 133-1 controls connection between the third output line and the ADC 113-3.

The selection unit 112-2 controls whether or not to connect the second output line (VSL2) and the fourth output line (VSL4) among the four output lines of each column to the ADC 113-2 or the ADC 113-4, so that the selection unit 112-2 selects the number of ADCs (column ADCs) which are output destinations of the signal of one pixel and to which the second output line (VSL2) and the fourth output line (VSL4) are outputted. In the same manner as in FIG. 1, the selection unit 112-2 includes a switch 131-2 (selection SW2), a switch 132-2 (ADSW2), and a switch 133-2 (ADSW4).

The switch 131-2 controls connection between the second output line and the fourth output line. When the switch 131-2 becomes ON state, the second output line and the fourth output line are connected and when the switch 131-2 becomes OFF state, the second output line and the fourth output line are disconnected. The switch 132-2 controls connection between the second output line and the ADC 113-2. The switch 133-2 controls connection between the fourth output line and the ADC 113-4.

In the case of the example in A of FIG. 2, two paths of constant current circuit units 114 (constant current circuit unit 114-1 and constant current circuit unit 114-2) are provided for each column.

The constant current circuit unit 114-1 is a constant current circuit connected to the first output line and the third output line and driven by being controlled by the control unit 101. Although the circuit configuration of the constant current circuit unit 114-1 is optional, in A of FIG. 2, for convenience of description, a MOS transistor 161-1 (LOAD1) is provided for the first output line and a MOS transistor 162-1 (LOAD3) is provided for the third output line.

The constant current circuit unit 114-2 is a constant current circuit connected to the second output line and the fourth output line and driven by being controlled by the control unit 101. Although the circuit configuration of the constant current circuit unit 114-2 is optional, in A of FIG. 2, for convenience of description, a MOS transistor 161-2 (LOAD2) is provided for the second output line and a MOS transistor 162-2 (LOAD4) is provided for the fourth output line.

In A of FIG. 2, only the configuration for one column is shown. However, in practice, the same four paths of output lines, two selection units 112, four column ADCs, and two constant current circuit units 114 are provided for each column and the same control is performed.

In the above description, one selection unit 112 controls two paths of connections between the output line and the ADC. However, it is not limited to this, and one selection unit 112 may control three or more paths of connections. Further, when a plurality of selection units 112 are provided as in the example of A of FIG. 2, the numbers of paths controlled by each selection unit 112 may be the same or may be different from each other.

[Read Mode Control]

Figure 3:
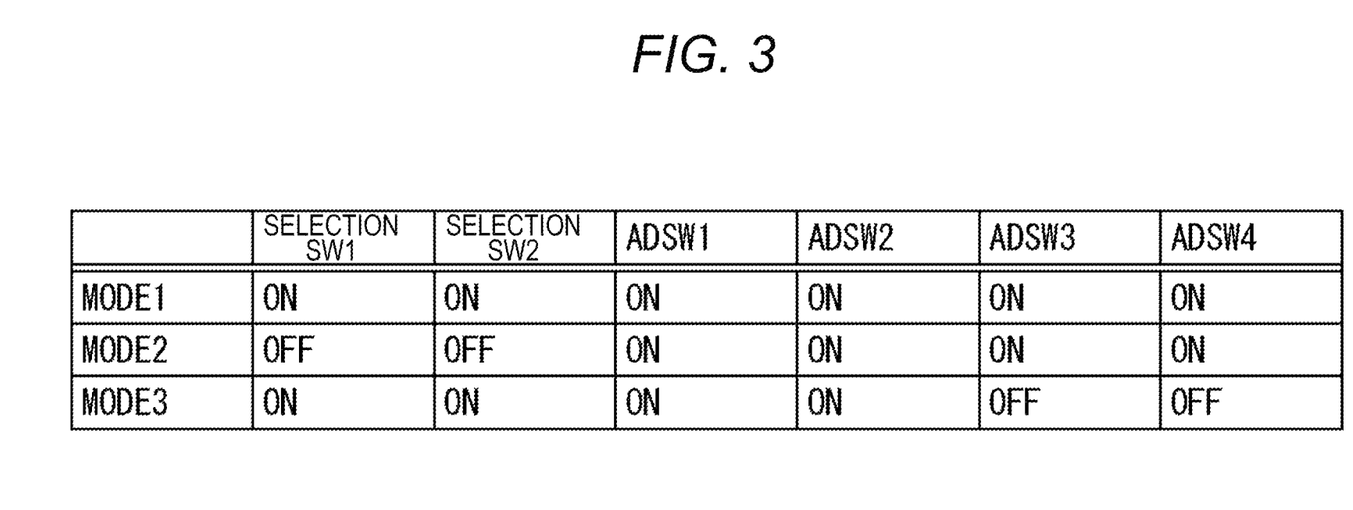
FIG. 3 is a diagram for explaining an example of states of selection unit control according to modes.

The control unit 101 controls open/close of each switch of the selection unit 112 as shown in, for example, the table in FIG. 3 according to a selected read mode.

For example, a mode 1 (MODE1) is a mode which implements highly functional reading in which dynamic range of output data is expanded and noise is reduced. In the case of mode 1, the control unit 101 turns ON all the switches of the selection unit 112-1 and the selection unit 112-2 (switches 131-1 to 133-1 and switches 131-2 to 133-2). Thereby, the pixel value of each pixel is supplied to a plurality of column ADCs. In other words, in the case of mode 1, each pixel signal can be signal-processed by a plurality of column ADCs, so that the image sensor 100 can implement various high-level functions as described later.

A mode 2 (MODE2) is a mode which achieves high-speed reading. In the case of mode 2, the control unit 101 turns OFF the switch 131 of each selection unit 112 (switches 131-1 and 131-2) and turns ON the other switches (switches 132-1 and 133-1 and switches 132-2 and 133-2). Thereby, the output line of each path is connected to a column ADC different from each other. In other words, in the case of mode 2, pixel signals of four rows can be read in parallel at the same time, so that the image sensor 100 can achieve high-speed reading.

A mode 3 (MODE3) is a mode which achieves low power consumption. In the case of mode 3, the control unit 101 turns OFF the switch 133 of each selection unit 112 (switches 133-1 and 133-2) and turns ON the other switches (switches 131-1 and 132-1 and switches 131-2 and 132-2). In other words, use of one column ADC of the two column ADCs corresponding to each selection unit 112 is stopped. That is to say, pixel signals of two rows are processed by a shared column ADC. Thereby, the number of the column ADCs to be operated is reduced, so that it is possible to achieve reading with low power consumption. In this case, two rows can be read at the same time.

In the mode 3, the control unit 101 may control the constant current circuit units 114 (constant current circuit unit 114-1 and constant current circuit unit 114-2) and cause the loads (MOS transistors) of the paths in which the column ADC is stopped to be stopped. In the case of the example in FIG. 3, the switch 133-1 and the switch 133-2 are turned off, so that the MOS transistor 162-1 (LOAD3) and the MOS transistor 162-2 (LOAD2) are stopped. By doing so, it is possible to achieve further low power consumption.

[High Functionalization of Reading]

Next, high functionalization of reading will be described. Any method for functionalizing reading may be used, and various methods are considered. For example, reading at a plurality of frame rates, increasing dynamic range, and reducing noise are considered. The methods will be described below.

[Reading a Plurality of Pieces of Information]

In the case of mode 2 (MODE2), the output line of each path is connected to a column ADC different from each other. In other words, the pixel signal outputted from each output line is signal-processed independently from each other. Therefore, a shutter operation, a reading operation, and the like of a pixel corresponding to an output line of each path can be set independently from each other. As a result, in the case of mode 2, a plurality of read modes can be used in parallel.

For example, a rate of reading a pixel of each path of each column can be set independently from each other. For example, in the example of A of FIG. 2, pixels corresponding to output lines of two paths of the four paths may be read at a first rate (for example, 30 fps) and pixels corresponding to output lines of the other two paths may be read at a second rate (for example, 240 fps) different from the first rate.

For example, in an image pickup apparatus such as a digital still camera, there is a preview mode in which an image (moving image) of an object is displayed on a monitor provided on a housing before a still image is picked up. As a general operation, in the preview mode, when a user checks a layout of an image to be picked-up and instructs the camera to pick up a still image by pressing a release button, a focal position is adjusted by an automatic focusing function, and thereafter the still image is picked up and recorded.

In such processing, the moving image displayed in the preview mode is used to check the image, so that the frame rate is desired to be a relatively low rate such as for example 30 fps in order to reduce the load of processing. On the other hand, when the automatic focusing processing is performed, it is desirable to more quickly determine the focal position in order to improve responsiveness from when the instruction of the user is issued to when the still image is picked up, so that the frame rate is desired to be a relatively high rate such as, for example, 240 fps.

Therefore, in general, the preview mode is performed at a low rate, and when an instruction to pick up an image is issued from the user, the frame rate is switched to a high rate and the automatic focusing is performed. However, in this case, when the frame rate is switched, there is a risk that unnecessary waiting time occurs.

Therefore, the image sensor 100 can further improve the responsiveness from when the instruction of the user is issued to when the still image is picked up by reading images at a plurality of frame rates at the same time in the mode 2.

Figure 4:
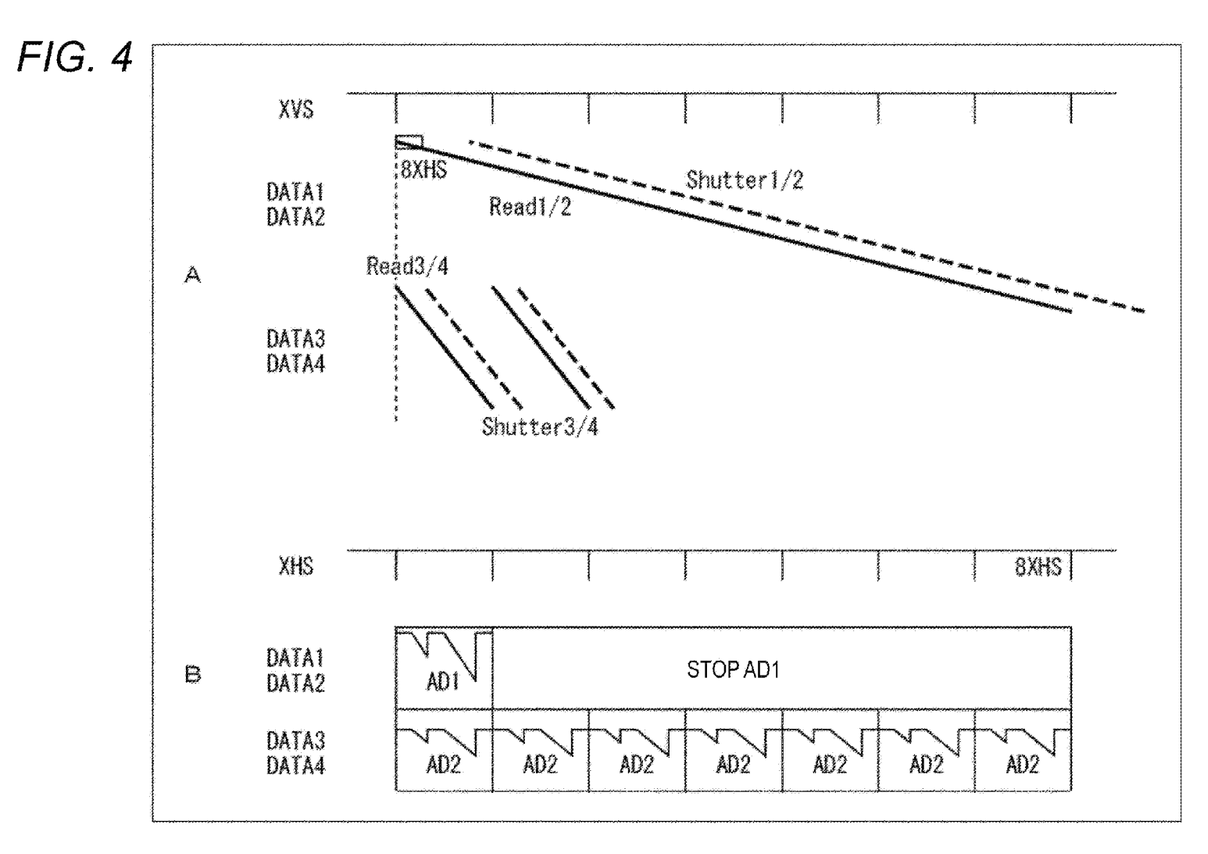
FIG. 4 is a diagram for explaining an example of a state of output at a plurality of frame rates.

An image diagram of the reading is shown in A of FIG. 4. The control unit 101 controls the pixel array unit 111, reads the pixel signals of the pixel 1 and the pixel 2 at 30 fps (Read 1/2), and reads the pixel signals of the pixel 3 and the pixel 4 at 240 fps (Read 3/4). In the case of mode 2, the pixels 1 to 4 are connected to the column ADCs different from each other. Each of the ADCs 113-1 to 113-4 may process the supplied pixel signal at their own rate. In other words, the image sensor 100 can implement data outputs at a plurality of rates.

More specifically, as shown in B of FIG. 4, the reading at a low rate is implemented by reducing the number of times of reading the pixel signal. In the case of the example in B of FIG. 4, the pixel signal read at the low rate (30 fps) is read once for every eight times the pixel signal read at a high rate (240 fps) is read, and the pixel signal read at the low rate is not read seven times for every eight times the pixel signal read at the high rate is read. Therefore, while the pixel signal read at the low rate is not read, the control unit 101 can stop the column ADCs (ADC 113-1 and ADC 113-2) of corresponding paths by controlling the ADC 113. Thereby, the control unit 101 can achieve reading with much lower power consumption.

In the case of reading at a plurality of rates, the pixels have to be divided for each rate. Specifically, the pixel signal of the same pixel cannot be read at a plurality of rates, so that a reading rate has to be set for each pixel. In other words, when an image is read at a plurality of rates, the resolution of an image read at each rate is lower than an image read at a single rate. For example, the resolution of an image used in the preview mode or the automatic focusing as described above is lower than the resolution of a still image. However, in general, a high resolution image is not required in the preview mode and the automatic focusing, so that there is no problem.

[Multi-Sampling]

Noise in the output data may be reduced by using the plurality of paths of outputs independent from each other in the mode 1.

Figure 5:
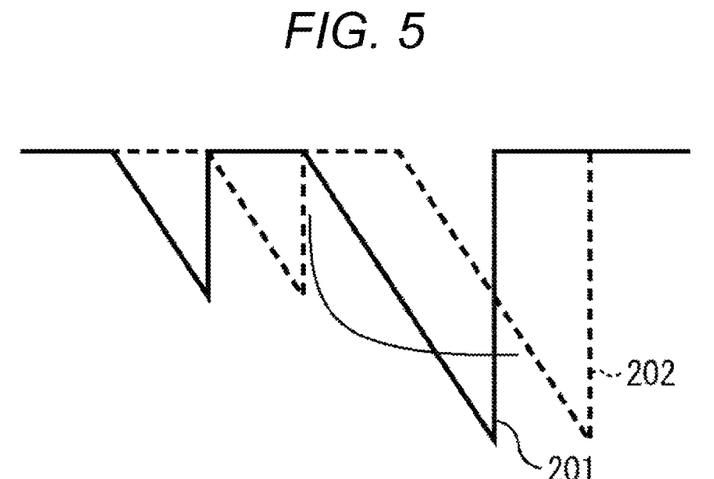
FIG. 5 is a diagram for explaining an example of a state of multi-sampling.

In this case, the control unit 101 may control each column ADC of the ADC 113, divide the sampling timing of P phase and D phase into a plurality of timings as indicated by a solid line 201 and a dashed line 202 shown in FIG. 5, and obtain an addition average of each output.

For example, the control unit 101 controls each column ADC and shifts DAC waveforms of the column ADCs of each path as shown in FIG. 5. The column ADCs of each path operate independently from each other, so that such control can be easily implemented. By doing so, the number of times of sampling is doubled, so that it is possible to improve the S/N ratio by outputting an addition average of signals obtained by both samplings. In other words, the control unit 101 can reduce noise of the output data. A plurality of column ADCs independent from each other are used, so that the control unit 101 can achieve such noise reduction in conversion processing faster than that performed by a single ADC.

[Wide Dynamic Range Function]

Dynamic range of the output data may be increased by using the plurality of paths of outputs independent from each other in the mode 1. For example, the control unit 101 controls each column ADC and sets gain of each path independently from each other. By doing so, the control unit 101 can increase the dynamic range of the output data. A plurality of column ADCs independent from each other are used, so that the control unit 101 can achieve such a wide dynamic range in conversion processing faster than that performed by a single ADC.

As described above, the control unit 101 can achieve high functionality of the output data with more various methods by controlling each unit. In other words, the image sensor 100 can implement more various data outputs.

The control unit 101 may set the resolution (the number of bits) of the column ADC of each path independently from each other by using the plurality of paths of outputs independent from each other in the mode 1. Further, the control unit 101 may perform a plurality of the aforementioned high functionalization operations at the same time. Further, the control unit 101 may perform high functionalization operations other than those described above.

[Flow of Control Processing]

Figure 6:
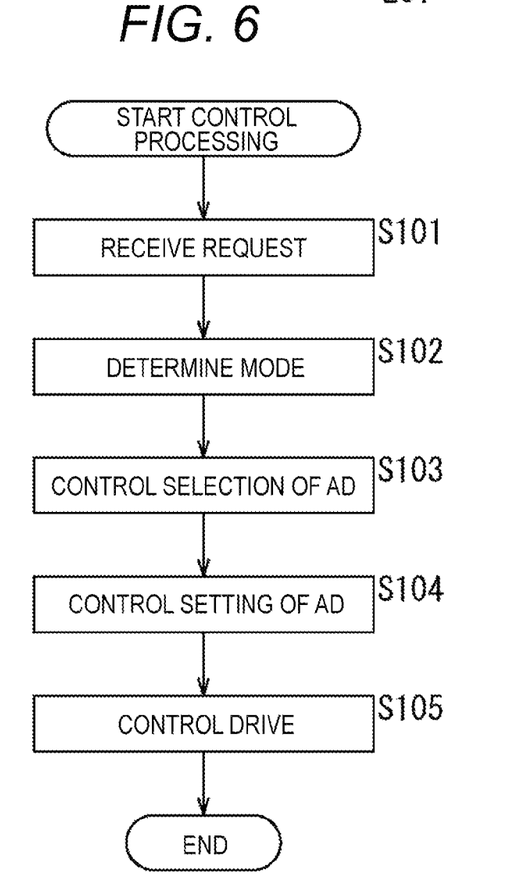
FIG. 6 is a flowchart for explaining an example of a flow of control processing.

An example of a flow of the control processing performed by the control unit 101 will be described with reference to a flowchart in FIG. 6.

When starting the control processing, the control unit 101 receives a request from outside in step S101. In step S102, the control unit 101 determines a mode corresponding to the received request.

In step S103, the control unit 101 sets the number of ADCs which are output destinations of the pixel signal of the circuit of one pixel by controlling the selection unit 112. For example, the control unit 101 performs ON/OFF control of each switch of the control unit 112 according to the mode as shown in the table of FIG. 3.

In step S104, the control unit 101 controls setting of each column ADC by controlling the ADC 113.

In step S105, the control unit 101 controls drive of each unit according to the mode and processing such as the high functionalization by controlling the pixel array unit 111, the selection unit 112, the ADC 113, and the constant current circuit unit 114.

When the pixel signals have been read, the control unit 101 ends the control processing.

By performing the processing in this way, the control unit 101 can implement more various data outputs to be able to be used for more various uses.

[Lamination]

Figure 7:
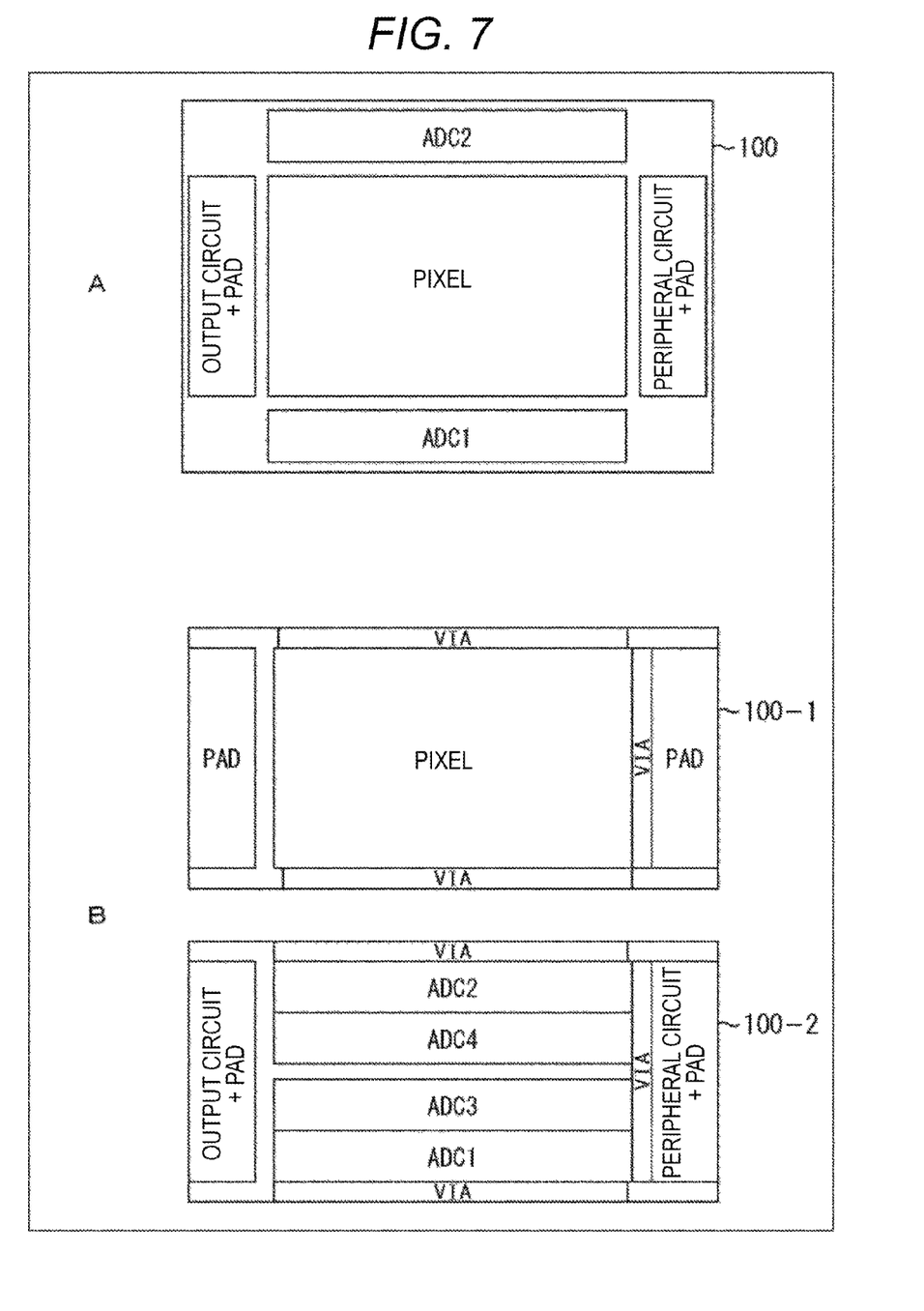
FIG. 7 is a diagram for explaining an example of a laminated chip structure.

As described above, when a plurality of ADCs are provided for each column, for example, in the configuration shown in A of FIG. 7, there is a risk that the chip size increases and the cost increases. Therefore, as shown in B of FIG. 7, the chip may have a laminated structure.

In the case of B of FIG. 7, the image sensor 100 is formed by a plurality of chips including a pixel chip 100-1 in which the pixel array unit 111 is mainly formed, a peripheral circuit chip 100-2 in which an output circuit, a peripheral circuit, the ADC 113, and the like are formed, and a pad (PAD). The output lines and a drive line of the pixel array unit 111 of the pixel chip 100-1 are connected to the circuits of the peripheral circuit chip 100-2 through a penetrating via (VIA).

By forming such a structure, it is possible to reduce the chip size and decrease the cost. Further, more room is made in the space in a wiring layer, so that it is possible to easily route the wiring. Further, each chip can be optimized by using a plurality of chips. For example, in the pixel chip, a low height is achieved by a small number of wiring layers in order to prevent the quantum efficiency from decreasing due to optical reflection by the wiring layers, and in the peripheral circuit chip, it is possible to have a large number of wiring layers in order to perform optimization such as a countermeasure against interlayer coupling. For example, the number of the wiring layers of the peripheral chip can be greater than the number of the wiring layers of the pixel chip.

In the case of a backside illumination type image sensor, although the optical reflection by the wiring layers does not occur, it is possible to suppress increase of the number of wiring processes and reduce the cost by suppressing increase of the number of unnecessary wiring layers.

Further, there is a chip area equal to a pixel chip area, so that it is possible to mount a plurality of ADCs on a peripheral circuit area without increasing a total area of the laminated chip.

The image pickup device (image pickup apparatus) to which the present technique is applied may have not only the configuration described above, but also other configurations.

2. Second Embodiment

[Imaging Device]

Figure 8:
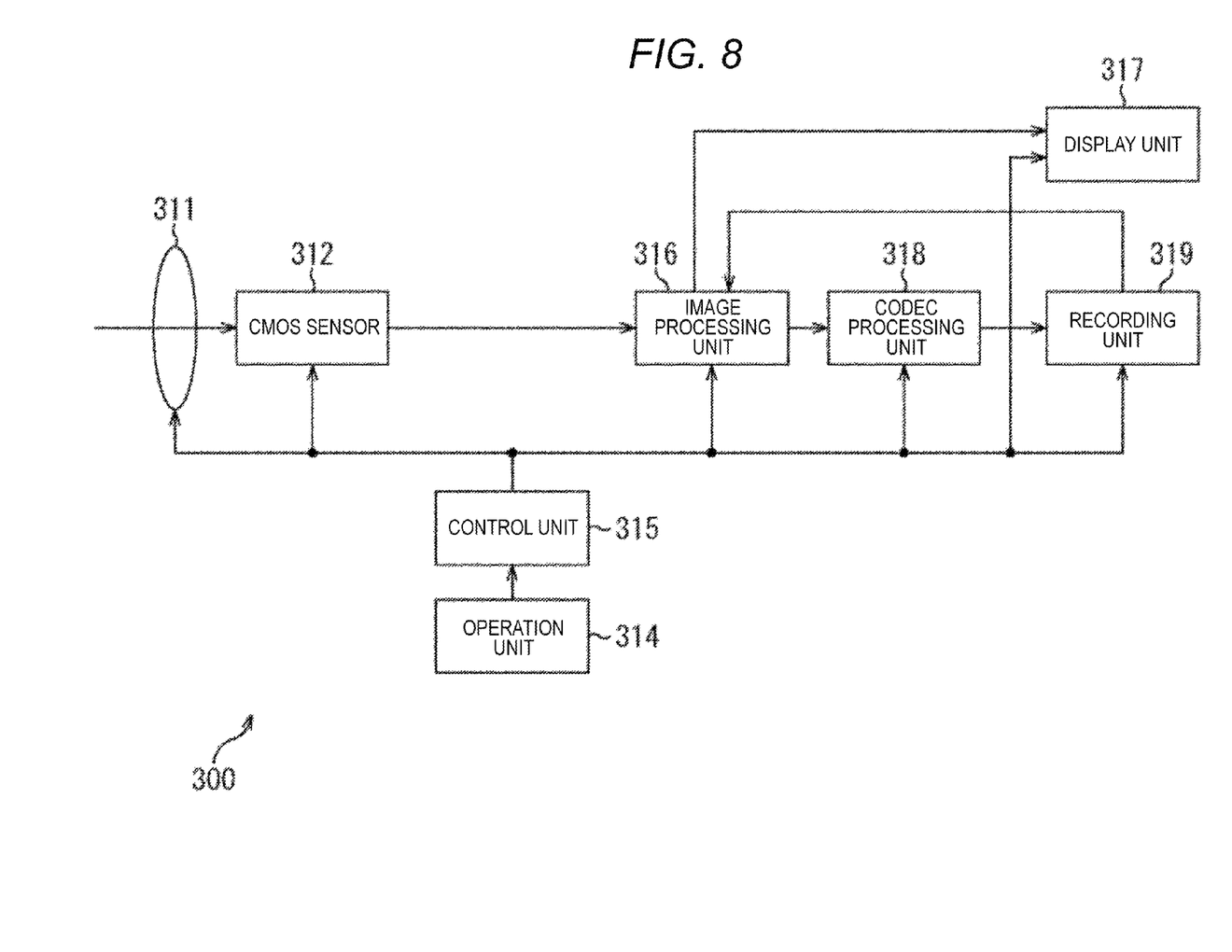
FIG. 8 is a block diagram showing a main configuration example of an image pickup apparatus to which the present technique is applied.

FIG. 8 is a diagram showing a main configuration example of an image pickup apparatus to which the present technique is applied. The image pickup apparatus 300 shown in FIG. 8 is an apparatus which picks up an image of an object and outputs the image of the object as an electrical signal.

As shown in FIG. 8, the image pickup apparatus 300 includes a lens unit 311, a CMOS sensor 312, an operation unit 314, a control unit 315, an image processing unit 316, a display unit 317, a codec processing unit 318, and a recording unit 319.

The lens unit 311 includes optical system elements such as a lens and a diaphragm. The lens unit 311 is controlled by the control unit 315, adjusts the focal point to the object, collects light from the focused position, and supplies the light to the CMOS sensor 312.

The CMOS sensor 312 is an image sensor which picks up an image of the object. The CMOS sensor 312 is controlled by the control unit 315 and obtains data (picked-up image) of the picked-up image of the object by photoelectrically converting the incident light and A/D converting pixel values of the pixels. The CMOS sensor 312 is controlled by the control unit 315 and supplies the picked-up image data obtained by the image picking-up operation to the image processing unit 316.

The operation unit 314 includes, for example, a jog dial (trademark), a key, a button, a touch panel, or the like, receives an operation input from a user, and supplies a signal corresponding to the operation input to the control unit 315.

The control unit 315 controls drives of the lens unit 311, the CMOS sensor 312, the image processing unit 316, the display unit 317, the codec processing unit 318, and the recording unit 319 on the basis of the signal corresponding to the operation input of the user inputted from the operation unit 314 and causes each unit to perform processing related to picking up an image.

The image processing unit 316 performs various image processing operations such as, for example, black level correction, color mixture correction, defect correction, demosaic processing, matrix processing, gamma correction, and YC conversion on the image signal supplied from the CMOS sensor 312. The content of the image processing is optional and processing other than the processing operations described above may be performed. The image processing unit 316 supplies the image signal on which the image processing is performed to the display unit 317 and the codec processing unit 318.

The display unit 317 is formed as, for example, a liquid crystal display, and displays an image of the object on the basis of the image signal from the image processing unit 316.

The codec processing unit 318 performs encoding processing of a predetermined method on the image signal from the image processing unit 316 and supplies image data obtained as a result of the encoding processing to the recording unit 319.

The recording unit 319 records the image data from the codec processing unit 318. The image data recorded in the recording unit 319 is read by the image processing unit 316 as needed, so that the image data is supplied to the display unit 317 and an image corresponding to the image data is displayed.

The CMOS sensor 312 of the image pickup apparatus 300 has the same configuration as that of the image sensor 100 described above with reference to FIGS. 1 and 2. In other words, the CMOS sensor 312 has a selection unit (switches) which selects the number of ADCs (column ADCs) which are output destinations of a signal of one pixel. In other words, the CMOS sensor 312 can output more various pixel signals according to the number of ADCs. Therefore, the image pickup apparatus 300 can implement more various processing operations by using the various pixel signals.

The image pickup apparatus including the image pickup device and the image processing unit to which the present technique is applied may have not only the configuration described above, but also other configurations.

3. Third Embodiment

[Computer]

The above described series of operations can be performed by hardware, and can also be performed by software. When the series of operations are to be performed by software, the programs forming the software are installed in a computer. Here, the computer includes a computer such as the control unit 315 in FIG. 8 which is embedded in dedicated hardware and a general purpose computer which can implement various functions by various programs installed in the computer.

Figure 9:
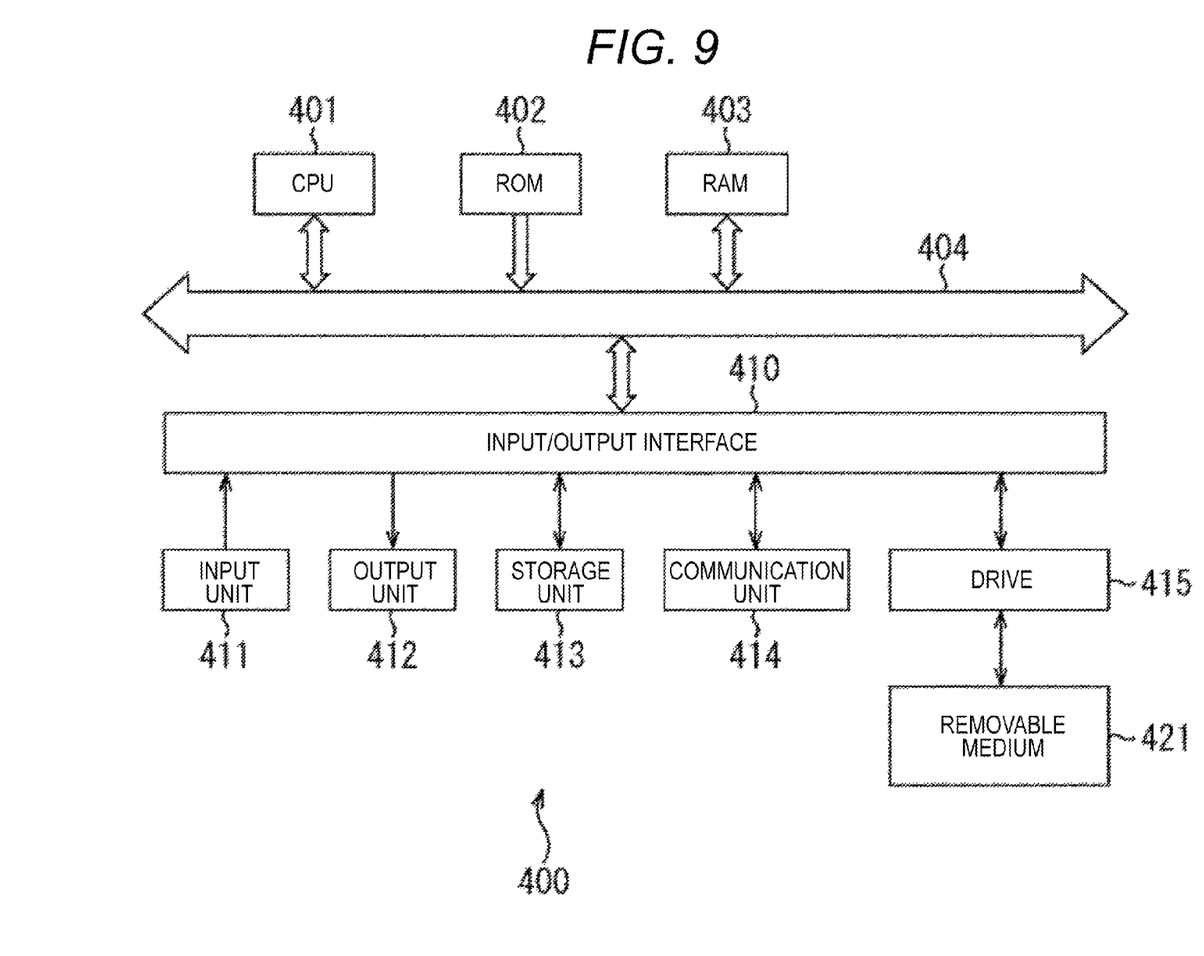
FIG. 9 is a block diagram showing a main configuration example of a computer.

In FIG. 9, the CPU (Central Processing Unit) 301 of a computer 400 performs various kinds of operations in accordance with a program stored in a ROM (Read Only Memory) 302, or a program loaded from a storage unit 413 into a RAM (Random Access Memory) 403. Necessary data for the CPU 401 to perform various kinds of operations and the like are also stored in the RAM 403, where necessary.

The CPU 401, the ROM 402, and the RAM 403 are connected to one another via a bus 404. An input/output interface 410 is also connected to the bus 404.

The input/output interface 410 has the following components connected thereto: an input unit 411 formed with a keyboard, a mouse, or the like; an output unit 412 formed with a display such as a CRT (Cathode Ray Tube) or a LCD (Liquid Crystal Display), and a speaker; the storage unit 413 formed with a hard disk or the like; and a communication unit 414 formed with a modem. The communication unit 414 performs communications via networks including the Internet.

A drive 415 is also connected to the input/output interface 410 where necessary, and a removable medium 521 such as a magnetic disk, an optical disk, a magnetooptical disk, or a semiconductor memory is mounted on the drive as appropriate. A computer program read from such a removable disk is installed in the storage unit 413 where necessary.

In a case where the above described series of operations is performed by software, the program forming the software is installed from a network or a recording medium.

As shown in FIG. 9, this recording medium is formed with the removable medium 421 that is distributed for delivering the program to users separately from the device, such as a magnetic disk (including a flexible disk), an optical disk (including a CD-ROM (Compact Disc-Read Only Memory) or a DVD (Digital Versatile Disc)), a magnetooptical disk (including an MD (Mini Disc)), or a semiconductor memory, which has the program recorded thereon. Alternatively, the recording medium may be formed with the ROM 402 having the program recorded therein or a hard disk included in the storage unit 413. Such a recording medium is incorporated beforehand into the device prior to the delivery to users.

The programs to be executed by the computer may be programs for performing operations in chronological order in accordance with the sequence described in this specification, or may be programs for performing operations in parallel or performing an operation when necessary, such as when there is a call.

In this specification, the step written in the program to be recorded in a recording medium includes operations to be performed in parallel or independently of one another if not necessarily in chronological order, as well as operations to be performed in chronological order in accordance with the sequence described herein.

In this specification, a system represents an entire apparatus including a plurality of devices (apparatuses).

Also, in the above described examples, any structure described as one device (or one processing unit) may be divided into two or more devices (or processing units). Conversely, any structure described as two or more devices (or processing units) may be combined to form one device (or one processing unit). Also, it is of course possible to add a structure other than the above described ones to the structure of any of the devices (or any of the processing units). Further, as long as the structure and function of the entire system remain the same, part of the structure of a device (or a processing unit) may be incorporated into another device (or another processing unit). In summary, the present technique is not limited by the embodiments described above, but may be variously modified without departing from the scope of the present technique.

The present technique may have the configurations described below.

(1) An image pickup device including a selection unit that selects the number of A/D converters that output a pixel signal of each pixel and a control unit that controls the selection unit and causes the selection unit to select the number of the A/D converters according to a request.

(2) The image pickup device described in the above item (1) further including a plurality of the A/D converters for each column of a pixel array, in which the selection unit selects an output destination of the pixel signal from among the plurality of A/D converters corresponding to the column.

(3) The image pickup device described in the above item (2), in which the control unit controls the selection unit so as to connect each pixel of the column to the plurality of A/D converters.

(4) The image pickup device described in the above item (2), in which the control unit divides the pixels of the column into a plurality of paths and controls the selection unit so as to connect pixels of each path to the A/D converter different from the A/D converters connected to pixels of the other paths.

(5) The image pickup device described in the above item (4), in which the control unit perform control so that a pixel signal is read from each pixel at a different rate for each path.

(6) The image pickup device described in the above item (4) or (5), in which the control unit controls the A/D converters and sets setting of each A/D converter to a setting value different from each other for each path.

(7) The image pickup device described in the above item (6), in which the control unit sets analog gain setting of the A/D converters to a value different from each other for each path.

(8) The image pickup device described in the above item (6) or (7), in which the control unit sets resolution setting of the A/D converters to a value different from each other for each path.

(9) The image pickup device described in any one of the above items (6) to (8), in which the control unit sets sampling timing of the A/D converters to a value different from each other for each path.

(10) The image pickup device described in the above item (9), in which the control unit controls the A/D converters so that outputs of the A/D converters of each path, which are sampled at timings different from each other and processed, are additionally averaged and outputted.

(11) The image pickup device described in any one of the above items (2) to (10), in which the control unit controls the selection unit so as to stop some of the A/D converters and connect pixels of the column to the remaining A/D converters.

(12) The image pickup device described in the above item (11), in which the control unit further stops constant current circuits corresponding to the stopped A/D converters.

(13) The image pickup device described in any one of the above items (1) to (12), including a laminated structure in which a plurality of chips are laminated.

(14) The image pickup device described in the above item (13), further including a pixel chip in which a pixel array from which the pixel signals are read is formed and a peripheral circuit chip in which a peripheral circuit, the control unit, the selection unit, and the A/D converters are formed.

(15) The image pickup device described in the above item (14), in which the number of wiring layers of the peripheral circuit chip is greater than the number of wiring layers of the pixel chip.

(16) A control method in which a receiving unit receives a request and a control unit selects the number of A/D converters that output a pixel signal of each pixel in a mode according to the received request.

(17) An image pickup apparatus including a pixel array in which incident light is photoelectrically converted at each pixel, a selection unit that selects the number of A/D converters that output a pixel signal of each pixel in the pixel array, and a control unit that controls the selection unit and causes the selection unit to select the number of the A/D converters according to a request.

REFERENCE SIGNS LIST

100 Image sensor
101 Control unit
111 Pixel array unit
112 Selection unit
113 ADC
114 Constant current circuit unit
121 and 122 Pixel
131 to 133 Switch
141 Comparator
142 DAC
143 Counter
151 Comparator
152 DAC
153 Counter
161 and 162 MOS
300 Image pickup apparatus
400 Computer

The invention claimed is:

1. An image pickup device comprising:
a first switch that is controllable to provide electrical connection and disconnection between a first pixel and a first analog-to-digital converter, the first switch is electrically connected between the first pixel and the first analog-to-digital converter;
a second switch that is controllable to provide electrical connection and disconnection between a second pixel and a second analog-to-digital converter, the second switch is electrically connected between the second pixel and the second analog-to-digital converter;
a selection switch that is controllable to provide electrical connection and disconnection between the first pixel and the second pixel, the second switch is electrically connected between the second analog-to-digital converter and the selection switch;
a first output line that directly electrically connects an output of the first pixel to an output of the third pixel, the second pixel is between the first pixel and a third pixel;
a control unit configured to control the first switch to electrically connect the first analog-to-digital converter to the first output line while simultaneously controlling the second switch; and
a second output line that directly electrically connects output of the second pixel to the second switch,
wherein the control unit is configured to control the selection switch to electrically connect the first output line to the second output line while simultaneously controlling the second switch to electrically disconnect the second analog-to-digital converter from the second output line.

2. The image pickup device according to claim 1, wherein a resolution of the first analog-to-digital converter differs from a resolution of the second analog-to-digital converter.

3. The image pickup device according to claim 1, further comprising:
a load electrically connected to the first output line, the control unit is configured to control the load electrically connected to the first output line.

4. The image pickup device according to claim 1, wherein the control unit is configured to control the first switch in response to a request.

5. The image pickup device according to claim 4, wherein the control unit is configured to control the second switch in response to the request.

6. The image pickup device according to claim 4, wherein the control unit is configured to control the selection switch in response to the request.

7. The image pickup device according to claim 1, further comprising:
a load electrically connected to the second output line, the control unit is configured to control the load electrically connected to the second output line.

8. The image pickup device according to claim 1, wherein the control unit is configured to control the selection switch to electrically disconnect the first output line from the second output line while simultaneously controlling the second switch to electrically connect the second analog-to-digital converter to the second output line.

9. The image pickup device according to claim 1, further comprising:
a fourth pixel between the first pixel and the second pixel,
a fifth pixel is between the fourth pixel and a sixth pixel.

10. The image pickup device according to claim 9, wherein the fifth pixel is between the second pixel and the third pixel, the third pixel is between the fifth pixel and the sixth pixel.

11. An image pickup device comprising:
a first switch that is controllable to provide electrical connection and disconnection between a first pixel and a first analog-to-digital converter, the first switch is electrically connected between the first pixel and the first analog-to-digital converter;
a second switch that is controllable to provide electrical connection and disconnection between a second pixel and a second analog-to-digital converter, the second switch is electrically connected between the second pixel and the second analog-to-digital converter;
a selection switch that is controllable to provide electrical connection and disconnection between the first pixel and the second pixel, the second switch is electrically connected between the second analog-to-digital converter and the selection switch;
a first output line that directly electrically connects an output of the first pixel to an output of the third pixel, the second pixel is between the first pixel and a third pixel;
a control unit configured to control the first switch to electrically connect the first analog-to-digital converter to the first output line while simultaneously controlling the second switch;
a second output line that directly electrically connects an output of the second pixel to the second switch; and
a fourth pixel between the first pixel and the second pixel,
a fifth pixel is between the fourth pixel and a sixth pixel,
a third output line that directly electrically connects an output of the fourth pixel to an output of the sixth pixel,
wherein the fifth pixel is between the second pixel and the third pixel, the third pixel is between the fifth pixel and the sixth pixel.

12. The image pickup device according to claim 9, wherein the control unit is configured to readout a pixel signal from the first pixel at a first rate and to readout a pixel signal from the fourth pixel at the first rate.

13. An image pickup device comprising:
a first switch that is controllable to provide electrical connection and disconnection between a first pixel and a first analog-to-digital converter, the first switch is electrically connected between the first pixel and the first analog-to-digital converter;
a second switch that is controllable to provide electrical connection and disconnection between a second pixel and a second analog-to-digital converter, the second switch is electrically connected between the second pixel and the second analog-to-digital converter;
a selection switch that is controllable to provide electrical connection and disconnection between the first pixel and the second pixel, the second switch is electrically connected between the second analog-to-digital converter and the selection switch;

a first output line that directly electrically connects an output of the first pixel to an output of the third pixel, the second pixel is between the first pixel and a third pixel;

a control unit configured to control the first switch to electrically connect the first analog-to-digital converter to the first output line while simultaneously controlling the second switch; and a second output line that directly electrically connects an output of the second pixel to the second switch;

a fourth pixel between the first pixel and the second pixel, a fifth pixel is between the fourth pixel and a sixth pixel, wherein the control unit is configured to readout a pixel signal from the first pixel at a first rate and to readout a pixel signal from the fourth pixel at the first rate, wherein the control unit is configured to readout a pixel signal from the second pixel at a second rate and to readout a pixel signal from the fifth pixel at the second rate, the second rate differing from the first rate, wherein the fifth pixel is between the second pixel and the third pixel, the third pixel is between the fifth pixel and the sixth pixel.

14. An image pickup apparatus comprising:
the image pickup device according to claim 1; and
a pixel array that photoelectrically converts incident light into signal charges, the first pixel and the second pixel are in the pixel array.

15. A control method wherein a second pixel is between a first pixel and a third pixel, the method comprising:
electronically controlling a first switch to electrically connect a first analog-to-digital converter to a first output line during a first mode, during a second mode and during a third mode;
electronically controlling a second switch to electrically connect a second analog-to-digital converter to a second output line during the first mode and during the second mode but not during the third mode; and
electronically controlling a selection switch to electrically connect the first output line to the second output line during the first mode and during the third mode but not during the second mode,
wherein the first output line directly electrically connects an output of the first pixel to an output of the third pixel, the second output line directly electrically connects an output of the second pixel to the second switch.

16. The method according to claim 15, further comprising:
using a request to determine whether a mode is the first mode, the second mode or the third mode.

17. The method according to claim 15, wherein a resolution of the first analog-to-digital converter differs from a resolution of the second analog-to-digital converter.

* * * * *